(12) United States Patent
Zhang et al.

(10) Patent No.: US 10,337,459 B2
(45) Date of Patent: Jul. 2, 2019

(54) NATURAL GAS FUELED VEHICLE

(71) Applicants: GM GLOBAL TECHNOLOGY OPERATIONS LLC, Detroit, MI (US); SHANGHAI WINNING ENERGY TECHNOLOGY CORP. LTD., Shanghai (CN)

(72) Inventors: Cunman Zhang, Shanghai (CN); Wei Zhou, Shanghai (CN); Mei Cai, Bloomfield Hills, MI (US); Anne M. Dailly, West Bloomfield, MI (US)

(73) Assignees: GM GLOBAL TECHNOLOGY OPERATIONS LLC, Detroit, MI (US); Shanghai Winning Energy Technology Corp. LTD, Shanghai (CN)

( * ) Notice: Subject to any disclaimer, the term of this patent is extended or adjusted under 35 U.S.C. 154(b) by 0 days.

(21) Appl. No.: 15/549,619

(22) PCT Filed: Feb. 13, 2015

(86) PCT No.: PCT/US2015/015907
§ 371 (c)(1),
(2) Date: Aug. 8, 2017

(87) PCT Pub. No.: WO2016/130156
PCT Pub. Date: Aug. 18, 2016

(65) Prior Publication Data
US 2018/0023516 A1 Jan. 25, 2018

(51) Int. Cl.
*F02M 21/02* (2006.01)
*F04C 23/00* (2006.01)
(Continued)

(52) U.S. Cl.
CPC ......... *F02M 21/0245* (2013.01); *B01D 45/08* (2013.01); *B01D 45/16* (2013.01);
(Continued)

(58) Field of Classification Search
CPC .. B01D 45/08; B01D 45/16; B60K 15/03006; F02M 21/0215; F02M 21/0221;
(Continued)

(56) References Cited

U.S. PATENT DOCUMENTS 3,717,050 A * 2/1973 Lundbom .............. B60K 31/06
123/338
4,522,159 A * 6/1985 Engel ................ B60K 15/03006
123/1 A
(Continued)

FOREIGN PATENT DOCUMENTS

CN 1869514 A 11/2006
JP H05-087069 A 4/1993

OTHER PUBLICATIONS

2012 Air Squared Mfg data sheet p16h034b-bldc.*
(Continued)

*Primary Examiner* — David Hamaoui
*Assistant Examiner* — Carl C Staubach
(74) *Attorney, Agent, or Firm* — Harness, Dickey & Pierce, P.L.C.

(57) ABSTRACT

A natural gas fueled vehicle, includes a natural gas fueled Internal Combustion Engine (ICE) to provide motive power to the vehicle. A pressurizable tank is disposed on the vehicle to contain a natural gas. A natural gas adsorbent is disposed in the tank. A fuel supply tube is to convey the natural gas to the ICE. A scroll compressor is on the vehicle to receive the natural gas from the tank and to deliver a first mixture of compressed natural gas and an oil to a gas and oil separator. The gas and oil separator is to receive the first mixture of the compressed natural gas and the oil from the scroll compressor and to separate the oil from the compressed natural gas and to deliver the compressed natural gas to the fuel supply tube substantially free from the oil.

16 Claims, 5 Drawing Sheets

(51) Int. Cl.
*F04C 18/02* (2006.01)
*B01D 45/08* (2006.01)
*B01D 45/16* (2006.01)
*F04C 28/08* (2006.01)
*F04C 28/26* (2006.01)
*F04C 29/00* (2006.01)
*B60K 15/03* (2006.01)
*F04F 5/24* (2006.01)

(52) U.S. Cl.
CPC .... *F02M 21/0215* (2013.01); *F02M 21/0221* (2013.01); *F02M 21/0296* (2013.01); *F04C 18/0207* (2013.01); *F04C 18/0269* (2013.01); *F04C 23/005* (2013.01); *F04C 28/08* (2013.01); *F04C 28/26* (2013.01); *F04C 29/0085* (2013.01); *B60K 15/03006* (2013.01); *F02M 21/0227* (2013.01); *F04C 2210/1044* (2013.01); *F04C 2210/1061* (2013.01); *F04C 2230/91* (2013.01); *F04C 2240/40* (2013.01); *F04C 2270/185* (2013.01); *F04F 5/24* (2013.01); *F05C 2203/08* (2013.01); *Y02T 10/32* (2013.01)

(58) Field of Classification Search
CPC ........... F02M 21/0227; F02M 21/0245; F02M 21/0296; F04C 18/0269; F04C 2210/1044; F04C 2230/91; F04C 2240/40; F04C 2270/185
See application file for complete search history.

(56) References Cited

U.S. PATENT DOCUMENTS

| | | | | |
|---|---|---|---|---|
| 5,009,680 | A * | 4/1991 | Brekke | B01D 45/02 95/247 |
| 5,832,906 | A * | 11/1998 | Douville | F17C 5/06 123/527 |
| 6,314,947 | B1 * | 11/2001 | Roche | F02M 37/10 123/497 |
| 6,890,490 | B1 * | 5/2005 | Fujita | F02B 43/10 422/112 |
| 8,672,646 | B2 * | 3/2014 | Ishizono | F04C 18/0207 417/410.5 |
| 9,249,931 | B2 | 2/2016 | Morales et al. | |
| 9,249,933 | B2 | 2/2016 | Morales et al. | |
| 9,328,868 | B2 | 5/2016 | Dailly et al. | |
| 9,624,851 | B2 | 4/2017 | Dailly et al. | |
| 9,746,134 | B2 | 8/2017 | Dailly et al. | |
| 9,874,311 | B2 | 1/2018 | Morales et al. | |
| 10,018,307 | B2 | 7/2018 | Ortmann et al. | |
| 2003/0077181 | A1 | 4/2003 | Rajewski | |
| 2005/0002800 | A1 | 1/2005 | Kimura et al. | |
| 2005/0247199 | A1 * | 11/2005 | Bauer | B01D 45/06 95/267 |
| 2008/0103676 | A1 * | 5/2008 | Ancimer | F02D 19/10 701/103 |
| 2014/0182561 | A1 | 7/2014 | Ibizugbe, Jr. | |
| 2014/0290611 | A1 | 10/2014 | Abd Elhamid et al. | |
| 2014/0291048 | A1 | 10/2014 | Morales et al. | |
| 2015/0020785 | A1 * | 1/2015 | An | F01M 13/02 123/572 |
| 2016/0017823 | A1 * | 1/2016 | Sloan | F02D 41/0027 123/457 |
| 2016/0097348 | A1 | 4/2016 | Abd Elhamid et al. | |
| 2017/0067415 | A1 * | 3/2017 | Cai | F02M 25/0854 |

OTHER PUBLICATIONS

1981 AICHE Journal Collection Efficiency of Cyclone Separators.*
Analysis of Cyclone Collection Efficiency Paraschiv.*
International Search Report and Written Opinion of the International Searching Authority issued in PCT/US2015/015907, dated Oct. 26, 2015, ISA/KR.

* cited by examiner

NATURAL GAS FUELED VEHICLE

CROSS REFERENCE TO RELATED APPLICATIONS

This application is a U.S. National Phase Application under 35 U.S.C. 371 of International Application No. PCT/US2015/015907 filed on Feb. 13, 2015 and published in English as WO 2016/130156 A1 on Aug. 18, 2016. The entire disclosure of the above application is incorporated herein by reference.

BACKGROUND

Some internal combustion engines (ICEs) are designed to operate on natural gas fuel. Such natural gas fueled ICEs may be dedicated natural gas engines, or multi-fuel engines. A dedicated natural gas engine operates only on natural gas. A multi-fuel engine is capable of operating on multiple fuel types. For example, bi-fuel engines are capable of operating on two different fuel types. One fuel type may be a liquid phase fuel including gasoline, ethanol, bio-diesel, diesel fuel or combinations thereof that are delivered to the bi-fuel engine substantially in a liquid state. The other fuel type may include an alternative fuel, e.g., Compressed Natural Gas (CNG), Adsorbed Natural Gas (ANG), Liquefied Petroleum Gas (LPG), hydrogen, etc. The two different fuels are stored in separate tanks, and the bi-fuel engine may run on one fuel at a time, or may alternatively run on a combination of the two different fuel types.

Natural gas may be stored on a vehicle in several ways. Some vehicles store the natural gas in pressurizable tanks. Some vehicles have a natural gas adsorbent in the natural gas tanks to increase the mass of natural gas that may be stored in the tank at a lower pressure. ANG is distinguished from CNG which is stored in pressurized vessels without adsorbent.

SUMMARY

A natural gas fueled vehicle, includes a natural gas fueled Internal Combustion Engine (ICE) to provide motive power to the vehicle. A pressurizable tank is disposed on the vehicle to contain a natural gas. A natural gas adsorbent is disposed in the tank. A fuel supply tube is to convey the natural gas to the ICE. A scroll compressor is on the vehicle to receive the natural gas from the tank and to deliver a first mixture of compressed natural gas and an oil to a gas and oil separator. The gas and oil separator is to receive the first mixture of the compressed natural gas and the oil from the scroll compressor and to separate the oil from the compressed natural gas and to deliver the compressed natural gas to the fuel supply tube substantially free from the oil.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
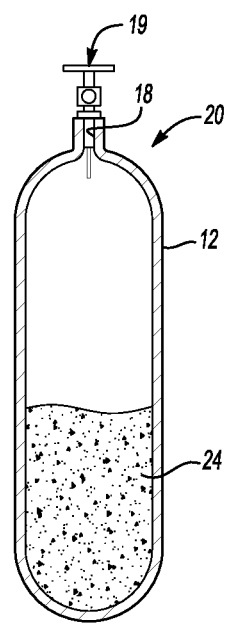
FIG. 1 is a cross-sectional, semi-schematic view of an example of a pressurizable tank according to the present disclosure.

Internal combustion engines (ICEs) combust fuel inside an engine to perform work. Some ICEs are used in vehicles to provide motive power to the vehicles. As used herein, vehicle means a self-propelled mobile machine that transports passengers or cargo. Examples of vehicles according to the present disclosure are: motor vehicles (motorcycles, cars, trucks, buses, trains), and watercraft (ships, boats).

In some cases, ICEs are defined by the type of fuel that the ICEs are designed to consume. For example, some diesel engines may run on diesel grade 1-D, or diesel grade 2-D. Gasoline engines may typically run on gasoline. Bi-fuel engines may be compatible with two types of fuel, for example, gasoline and natural gas.

SAE International, initially established as the Society of Automotive Engineers (SAE), is a U.S.-based, globally active professional association and standards organization for engineering professionals in various industries.

As used herein, liquid fuels are fuels that are generally in a liquid phase at standard ambient temperature 25° C. and pressure (100 kPa absolute). It is to be understood that even though liquid fuels are generally in the liquid phase, the liquid fuels may be volatile, and may completely evaporate if left in an open container for a certain amount of time. As used herein, liquid fuels have boiling points that are higher than 25° C. It is to be understood that some liquid fuels are blends of a plurality of component liquid fuels.

SAE Surface Vehicle Recommended Practice J1616, Recommended Practice for Compressed Natural Gas Vehicle Fuel, Issued February 1994, describes natural gas as follows: Natural gas is comprised chiefly of methane (generally 88 to 96 mole percent) with the balance being a decreasing proportion of non-methane alkanes (i.e., ethane, propane, butanes, etc.). Other components found in natural gas are nitrogen ($N_2$), carbon dioxide ($CO_2$), water, oxygen, and trace amounts of lubricating oil (from compressors) and sulfur found as hydrogen sulfide ($H_2S$) and other sulfur compounds. Before entering the commercial natural gas transmission system, natural gas is processed to meet limits on hydrogen sulfide, water, condensables of heavier hydrocarbons, inert gases such as $CO_2$ and $N_2$, and energy content. Mercaptan odorants (e.g., tertiary butyl mercaptan) are added by local distribution companies (LDC's) to add a human-detectable odor to natural gas which otherwise would be odorless.

As used herein, natural gas means a hydrocarbon gas mixture including predominately methane. Natural gas may include varying amounts of other higher alkanes and smaller amounts of carbon dioxide, nitrogen, and hydrogen sulfide. In an example, natural gas components by mass fraction may be about: methane 81.55%, ethane 6.79%, propane 4.98%, hexane 0.97%, hydrogen 0.01%, carbon monoxide 0.16%, and inert gases (nitrogen) 5.4%. The amount of methane in natural gas may vary, depending on the source. In another example, natural gas components by mass may be about: methane 75%, ethane 15%, and other hydrocarbons about 5%.

Referring now to FIG. 1, an example of the pressurizable tank 20 is depicted. The pressurizable tank 20 generally includes a container 12 and a natural gas adsorbent 24 operatively disposed within the container 12. While the shape of the container 12 shown in FIG. 1 is a cylindrical canister, it is to be understood that the shape and size of the container 12 may vary depending, at least in part, on an available packaging envelope for the pressurizable tank 20 in the natural gas fueled vehicle 10. For example, the size and shape may be changed in order to fit into a particular area of a vehicle trunk.

In the example shown in FIG. 1, the container 12 is a single unit having a single opening 18 or entrance. The opening 18 may be operatively fitted with a valve member 19, for charging the container 12 with the gas or for drawing-off the gas from the container 12. It is to be understood that manual and/or solenoid activated tank valves may be used in examples of the present disclosure. The valve member 19 is operatively connected to, and in fluid communication with the container 12 via the opening 18 defined in a wall of the container 12, the container wall having a thickness ranging, e.g., from about 3 mm to about 10 mm. It is to be understood that the opening 18 may be threaded for a typical tank valve (e.g., ¾×14 NGT (National Gas Taper Thread)). Further, it is to be understood that opening 18 may be located at any area of the container wall and is not necessarily located at the end as shown in FIG. 1.

While not shown, it is to be understood that the container 12 may be configured with other containers so that the multiple containers are in fluid (e.g., gas) communication through a manifold or other suitable mechanism.

As illustrated in FIG. 1, the natural gas adsorbent 24 is positioned within the container 12. Suitable adsorbents 24 are at least capable of releasably retaining methane compounds (i.e., reversibly storing or adsorbing methane molecules). In some examples, the selected adsorbent 24 may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the selected adsorbent 24 may be inert to some of the natural gas components and capable of releasably retaining other of the natural gas components.

In general, the adsorbent 24 has a high surface area and is porous. The size of the pores is generally greater than the effective molecular diameter of at least the methane compounds in the natural gas. In an example, the pore size distribution is such that there are pores having an effective molecular diameter of the smallest compounds to be adsorbed and pores having an effective molecular diameter of the largest compounds to be adsorbed. In an example, the adsorbent 24 has a Brunauer-Emmett-Teller (BET) surface area greater than about 50 square meters per gram (m2/g) and up to about 2,000 m2/g, and includes a plurality of pores having a pore size from about 0.20 nm (nanometers) to about 50 nm.

Suitable adsorbents 24 are at least capable of releasably retaining methane (i.e., reversibly storing or adsorbing and desorbing methane molecules). In some examples, the selected adsorbent may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the selected adsorbent may be inert to some of the natural gas components and capable of releasably retaining other of the natural gas components.

Examples of suitable adsorbents 24 include carbon (e.g., activated carbons, super-activated carbon, carbon nanotubes, carbon nanofibers, carbon molecular sieves, zeolite templated carbons, etc.), zeolites, metal-organic framework (MOF) materials, porous polymer networks (e.g., PAF-1 or PPN-4), and combinations thereof. Examples of suitable zeolites include zeolite X, zeolite Y, zeolite LSX, MCM-41 zeolites, silicoaluminophosphates (SAPOs), and combinations thereof. Examples of suitable metal-organic frameworks include HKUST-1, MOF-74, ZIF-8, and/or the like, which are constructed by linking tetrahedral clusters with organic linkers (e.g., carboxylate linkers).

The volume that the adsorbent 24 occupies in the container 12 will depend upon the density of the adsorbent 24. In an example, the density of the adsorbent 24 may range from about 0.1 g/cc to about 0.9 g/cc. A well-packed adsorbent 24 may have a density of about 0.5 g/cc. In an example, a 100 L container may include an amount of adsorbent that occupies about 50 L. For example, an amount of adsorbent that occupies about 50 L means that the adsorbent would fill a 50 L container. It is to be understood, however, that there is space available between the particles of adsorbent, and having an adsorbent that occupies 50 L in a 100 L container does not reduce the capacity of the container for natural gas by 50 L.

The pressurizable tank 20 may also include a guard bed (not shown) positioned at or near the opening 18 of the container 12 so that introduced natural gas passes through the guard bed before reaching the adsorbent 24. In examples, the guard bed may be to filter out certain components (e.g. contaminants) so that only predetermined components (e.g., methane and other components that are reversibly adsorbed on the adsorbent 24) reach the adsorbent 24. It is contemplated that any adsorbent that will retain the contaminants may be used as the guard bed. For example, the guard bed may include an adsorbent material that will remove higher hydrocarbons (i.e. hydrocarbons with more than 4 carbon atoms per molecule) and catalytic contaminants, such as hydrogen sulfide and water. In an example, the guard bed may include adsorbent material that retains one or more of the contaminants while allowing clean natural gas to pass therethrough. By retaining the contaminants, the guard bed protects the adsorbent 24 from exposure to the contaminants. The level of protection provided by the guard bed depends on the effectiveness of the guard bed in retaining the contaminants. The pore size of the adsorbent in the guard bed may be tuned/formulated for certain types of contaminants so that the guard bed is a selective adsorbent.

In some instances, the adsorbent 24 may be regenerated, so that any adsorbed components are released, and the adsorbent 24 is cleaned. In an example, regeneration of adsorbent 24 may be accomplished either thermally or with inert gases. For one example, hydrogen sulfide may be burned off when the adsorbent is treated with air at 350° C. In another example, contaminants may be removed when the adsorbent is flushed with argon gas or helium gas. After a regeneration process, it is believed that the original adsorption capacity of adsorbent 24 is substantially, if not completely, recovered.

Figure 2:
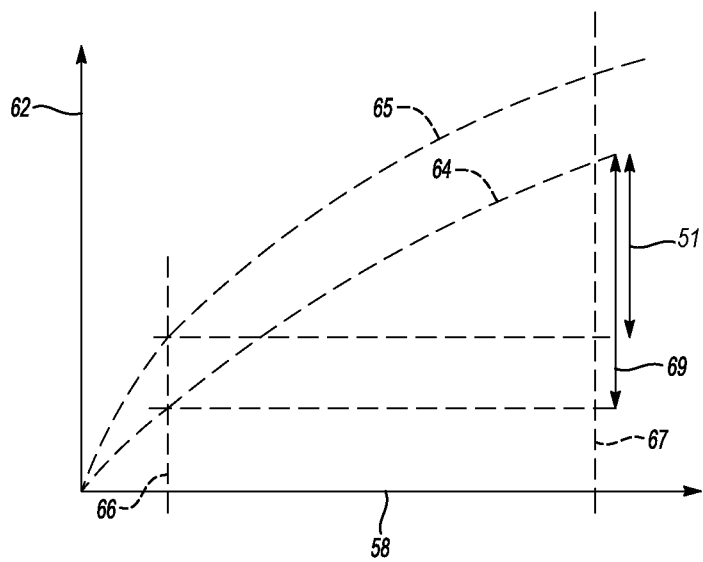
FIG. 2 is a graph depicting an example of an adsorption curve for natural gas.

FIG. 2 is a graph depicting an example of an adsorption curve for natural gas. In the graph of FIG. 2, the ordinate axis shows volumetric storage density 62 of natural gas in the pressurizable tank 20 with adsorbent 24. The volumetric storage density 62 in the graph in FIG. 2 is in units of grams per liter. The abscissa of the graph in FIG. 2 is the tank pressure 58. The tank pressure 58 depicted in FIG. 2 is in units of Bars. An isotherm corresponding to room temperature is shown at reference numeral 64. As used herein, room temperature means about 20° C. (degrees Celsius). An isotherm corresponding to a temperature less than room temperature is shown at reference numeral 65. The cut-off pressure is depicted at reference numeral 66. The fill/equilibrium pressure is depicted at reference numeral 67.

The adsorption of natural gas 22 into the adsorbent 24 is normally exothermic. In some ANG containers, the temperature of the adsorbent 24 rises during filling with natural gas. Conversely, discharging the natural gas from the absorbent 24 in the ANG container is endothermic, and may cause the temperature of the adsorbent 24 to drop. Since, as shown in FIG. 2, the volumetric storage density increases with falling temperature, the adsorbent 24 tends to "hold" the natural gas longer, thereby slowing the rate of desorption of natural gas 22 from the adsorbent 24. If the rate of desorption is not equal to or greater than the rate of extraction of natural gas 22 from the pressurizable tank 20, the tank pressure 58 may temporarily fall. When the tank pressure 58 nears the cut-off pressure 66, the desorption thermal behavior may cause the tank pressure 58 to drop below the cut-off pressure 66 even though, at equilibrium, the tank pressure 58 would be above the cut-off pressure 66. An actual delivered capacity 51 is a difference between a room temperature 64 volumetric storage capacity at the fill/equilibrium pressure 67 and a temperature less than room temperature 65 volumetric storage capacity at the cut-off pressure 66. An expected usable capacity 69 is a difference between the room temperature 64 volumetric storage capacity at the fill/equilibrium pressure 67 and a room temperature 64 volumetric storage capacity at the cut-off pressure 66.

Examples of the present disclosure utilize the natural gas 22 available at pressures between a cut-off pressure and a minimum pressure (that heretofore had been left unused). The cut-off pressure, leading to an automatic switch from natural gas to an alternate fuel (e.g., gasoline, diesel, etc.), on an existing bi-fuel vehicle (or to electrical power on an existing hybrid vehicle) is generally set to relatively high values in order to satisfy the high engine demands and desired vehicle performance. As one example, on a bi-fuel truck, the cut-off pressure may be set at 400 psi, which is about one-ninth of the total pressure of a high pressure type 3 tank (3600 psi service pressure). Further, if the bi-fuel truck in the example has a low pressure tank (700-750 psi service pressure), a 400 psi cut-off pressure accounts for more than half of the total pressure.

It is to be understood that the cut-off pressure is generally determined with regard to the maximum output power of the engine. Output power means an amount of energy output per unit time. Since there is a physical law of conservation of energy, the output power out of the engine is limited to the rate of energy supplied to the engine. Most of the energy supplied to a natural gas engine is in the form of chemical energy stored in the natural gas 22 that is released by combustion in the engine. The amount of chemical energy available is directly proportional to the available mass of the natural gas 22. Therefore, the rate of energy supplied to the engine is directly proportional to the mass flow rate of natural gas 22 to the engine.

In examples of the present disclosure, the maximum mass flow rate of the natural gas to the engine is related to the pressure of the natural gas supplied to the gas fuel injector 74. Since the gas fuel injector 74 has a maximum volume of natural gas 22 that can be delivered per combustion cycle of the engine, the pressure of the natural gas 22 in the fuel rail 72 that feeds into the gas fuel injector 74 determines the maximum mass of fuel injected into the cylinder per combustion cycle (assuming that the temperature of the natural gas 22 in the fuel rail 72 does not vary substantially). Although reference is made to the gas fuel injector 74 in the singular form, it is to be understood that a plurality of gas fuel injectors 74 may be used.

In an existing vehicle with a bi-fuel engine, the pressure of the natural gas in the fuel rail is about the same as the pressure in the natural gas tank. In some existing natural gas powered vehicles, a pressure regulator may limit the pressure in the fuel rail to a maximum value when the pressure of the natural gas in the tank is high, for example about 25 MPa. As such, the maximum output power of the existing bi-fuel engine is related to the pressure of the natural gas in the natural gas container.

As used herein, the cut-off pressure is the pressure in the pressurizable tank 20 that will feed the ICE 71 with natural gas 22 at a sufficient mass flow rate to achieve the maximum output power of the ICE 71. In some existing bi-fuel engines, the natural gas remaining in the natural gas container is not used after the pressure in the natural gas container has diminished below the cut-off pressure.

In sharp contrast, however, in an example of the present disclosure, the natural gas 22 may be extracted from the pressurizable tank 20 at below the cut-off pressure 66 and boosted by a scroll compressor 30 to a fuel rail pressure 73 greater than the cut-off pressure 66. Using the portion of natural gas 22 remaining in the pressurizable tank 20 below the cut-off pressure 66 allows the natural gas fueled vehicle 10 to extend the distance that the natural gas fueled vehicle 10 can be driven without refueling and without limiting the output power of ICE 71.

Figure 3:
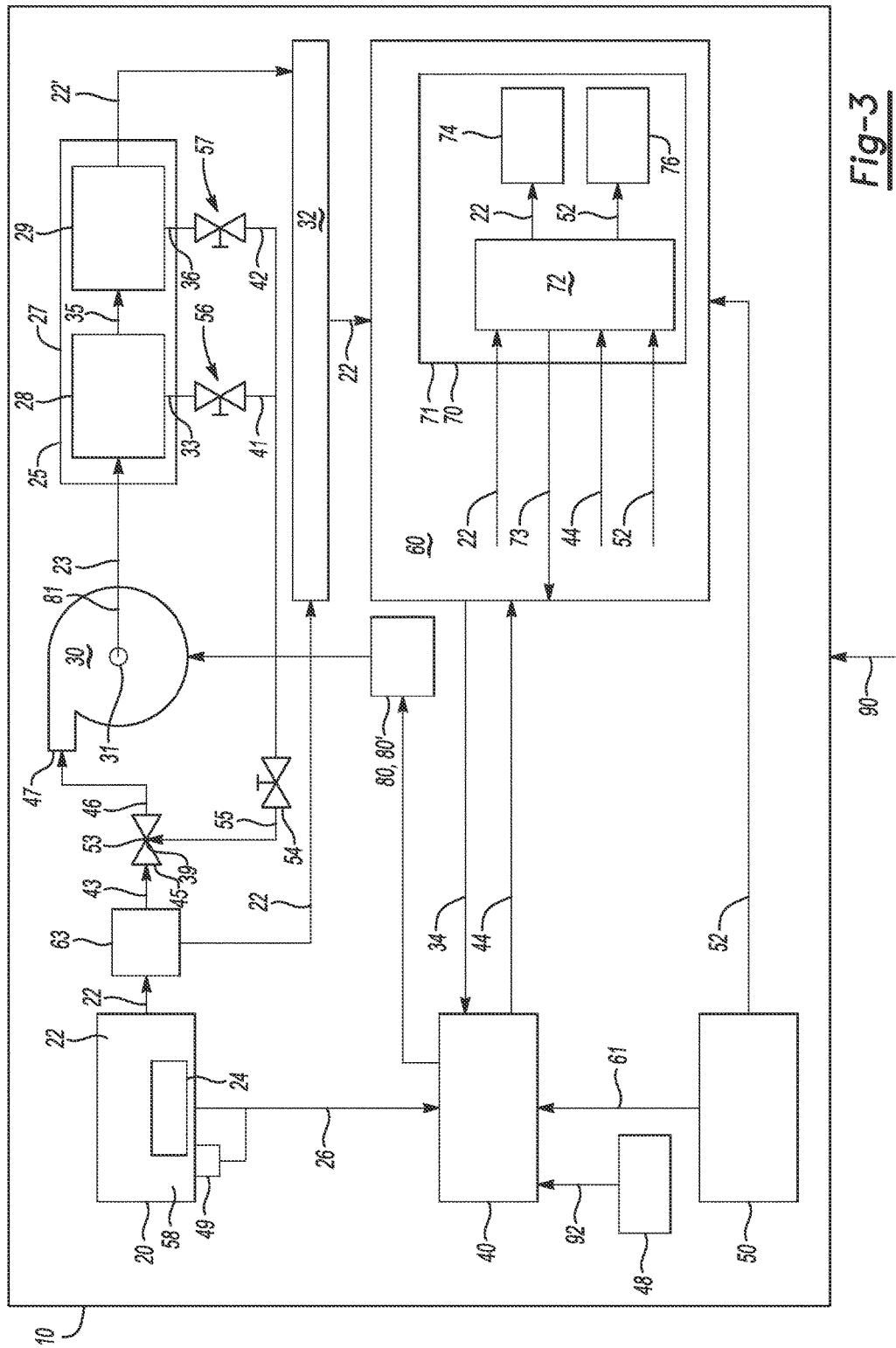
FIG. 3 is a system block diagram depicting an example of a vehicle having a powertrain with a bi-fuel engine according to the present disclosure.

FIG. 3 is a system block diagram depicting an example of a natural gas fueled vehicle 10 having a powertrain 60 with a bi-fuel engine 70 according to the present disclosure. The natural gas fueled vehicle 10 is depicted in an environment 90. The natural gas fueled vehicle 10 has sensors 48 that provide environmental data 92 to the electronic control module (ECM) 40. Examples of the environmental data 92 include ambient air pressure, temperature, and humidity. The natural gas fueled vehicle 10 has a pressurizable tank 20 onboard to contain a natural gas 22. The pressurizable tank 20 has a natural gas adsorbent 24 inside the pressurizable tank 20. The pressurizable tank 20 sends the natural gas 22 to the powertrain 60. Gas Data 26 about the natural gas 22 in the pressurizable tank 20 is sent to the ECM 40. In the example depicted in FIG. 3, the natural gas fueled vehicle 10 has a bi-fuel engine 70. Therefore, the vehicle 10 has a liquid fuel tank 50. The liquid fuel tank 50 sends liquid fuel 52 to the powertrain 60. Liquid fuel data 61 about the liquid fuel 52 in the liquid fuel tank 50 (for example, fuel level) is sent to the ECM 40. The powertrain 60 sends powertrain data 34 to the ECM 40. Examples of powertrain data 34 include any data from the engine used to control the engine. For example, engine speed and temperature. The bi-fuel engine 70 has a gas fuel injector 74 and a liquid fuel injector 76. Both the gas fuel injector 74 and the liquid fuel injector 76 share the same fuel rail 72. The ECM 40 sends the fuel source control 44 to select which fuel, natural gas 22, or liquid fuel 52 gets sent into the fuel rail 72.

As depicted in FIG. 3, a fuel supply tube 32 is to convey the natural gas 22 to the ICE 71. A scroll compressor 30 on the natural gas fueled vehicle 10 is to receive the natural gas 22 from the pressurizable tank 20. The scroll compressor 30 is to compress the natural gas 22 and to deliver a first mixture 23 of compressed natural gas and an oil to a gas and oil separator 25. The gas and oil separator 25 is to receive the first mixture 23 of the compressed natural gas and the oil from the scroll compressor 30 and to separate the oil from the compressed natural gas and to deliver the compressed natural gas 22' to the fuel supply tube 32 substantially free from oil. As used herein, substantially free from oil means at least 99 percent of the oil, measured by volume, in the first mixture 23 of the compressed natural gas and the oil has been removed from the compressed natural gas 22" delivered to the fuel supply tube.

As depicted in FIG. 3, the gas and oil separator 25 is a two-stage gas and oil separator 27 having a first stage gas and oil separator 28 in fluid communication with an output 31 of the scroll compressor 30 to separate a first portion 33 of the oil from the first mixture 23 of the compressed natural gas and the oil and discharge a second mixture 35 of the compressed natural gas and the oil to be received by a second stage gas and oil separator 29. The second stage gas and oil separator 29 is to separate a second portion 36 of the oil from the second mixture 35 of the compressed natural gas and the oil to discharge the compressed natural gas 22' to the fuel supply tube 32. As depicted in FIG. 3, a first oil recirculation tube 41 is to convey the first portion 33 of the oil from the first stage gas and oil separator 28 to the scroll compressor 30 to replenish the oil delivered in the first mixture 23 of the compressed natural gas and the oil. A second oil recirculation tube 42 is to convey the second portion 36 of the oil from the second stage gas and oil separator 29 to the scroll compressor 30 to replenish the oil delivered in the first mixture 23 of the compressed natural gas and the oil. The first oil recirculation tube 41 and the second oil recirculation tube 42 may be in fluid connection with a main oil recirculation tube 55.

As depicted in FIG. 3, a venturi 45 is depicted in a flowpath 46 leading to an intake 47 of the scroll compressor 30. The venturi 45 is to draw the first portion 33 of the oil from the first stage gas and oil separator 28 and the second portion 36 of the oil from the second stage gas and oil separator 29 into a stream 43 of natural gas 22 from the pressurizable tank 20 via an oil port 39 in the venturi throat 53.

In examples of the present disclosure, an oil flow regulator 54 may be included in the main oil recirculation tube to throttle a main oil flow to the oil port 39. In some examples, the oil flow regulator 54 may be omitted and replaced by a first oil flow regulator 56 and a second oil flow regulator 57. The first oil flow regulator 56 is to throttle a first oil flow from the first stage gas and oil separator 28 to the oil port 39. Similarly, the second oil flow regulator 57 is to throttle a second oil flow from the second stage gas and oil separator 29 to the oil port 39. The first oil flow and the second oil flow may be mixed to form the main oil flow. As used herein, to "throttle" means to regulate a flow by making a restriction or an equivalent to a restriction in a flow path. A restriction may be, for example, an orifice that is smaller than the upstream flowpath. An equivalent to a restriction may be, for example, a tortuous path that allows a similar amount of flow as an orifice of a particular size.

Still referring to FIG. 3, examples of the natural gas fueled vehicle 10 of the present disclosure may include an electric motor 80 operatively connected to the scroll compressor 30 to drive the scroll compressor 30. A pressure sensor 49 may be in fluid communication with the pressurizable tank 20 to determine a tank pressure 58 of the natural gas 22 in the pressurizable tank 20. The electronic control module 40 is to control operation of the electric motor 80 in response to the tank pressure 58. The electronic control module 40 causes the electric motor 80 to drive the scroll compressor 30 to compress the natural gas 22 when the tank pressure 58 is between a minimum tank pressure and an uncompressed cut-off pressure. The electronic control module 40 causes the electric motor 80 to stop thereby preventing the scroll compressor 30 from compressing the natural gas 22 when the tank pressure 58 is greater than the uncompressed cut-off pressure.

In examples of the present disclosure, the electric motor 80 may have an input power of from about 200 Watts to about 10 Kilowatts and an input voltage from about 6 VDC (Volts Direct Current) to about 100 VDC. In examples of the present disclosure, the electric motor 80 may be powered from a vehicle DC power bus (not shown), or the electric motor 80 may have a dedicated source of electrical power (not shown).

In examples of the present disclosure, the electric motor 80 may be a variable speed electric motor 80'. The electronic control module 40 may regulate an output pressure 81 of the scroll compressor 30 by changing the speed of the variable speed electric motor 80' in response to the tank pressure 58 and a fuel rail pressure 73.

Still referring to FIG. 3, in examples of the present disclosure a compressor bypass valve 63 may be to enter a bypass mode to cause the natural gas 22 to bypass the scroll compressor 30 and flow through the fuel supply tube 32 at about the tank pressure 58 when the tank pressure 58 is greater than the uncompressed cut-off pressure.

In examples of the present disclosure, the compressor bypass valve 63 may be electrically controlled, and a biasing spring (not shown) causes the compressor bypass valve 63 to enter the bypass mode and remain in the bypass mode when the compressor bypass valve 63 is electrically unpowered.

In other examples, the compressor bypass valve 63 may be mechanically controlled. For example, the compressor bypass valve 63 may be controlled mechanically by the tank pressure 58 operating on a spring biased piston or a check valve (not shown). The biasing spring may cause the compressor bypass valve 63 to enter the bypass mode and remain in the bypass mode when the tank pressure 58 is greater than the uncompressed cut-off pressure.

In examples of the present disclosure, the gas and oil separator 25 may include a cyclonic gas and oil separator stage 37 (see FIG. 5), a labyrinthal gas and oil separator stage 38 (see FIG. 6), or a combination thereof.

Figure 4:
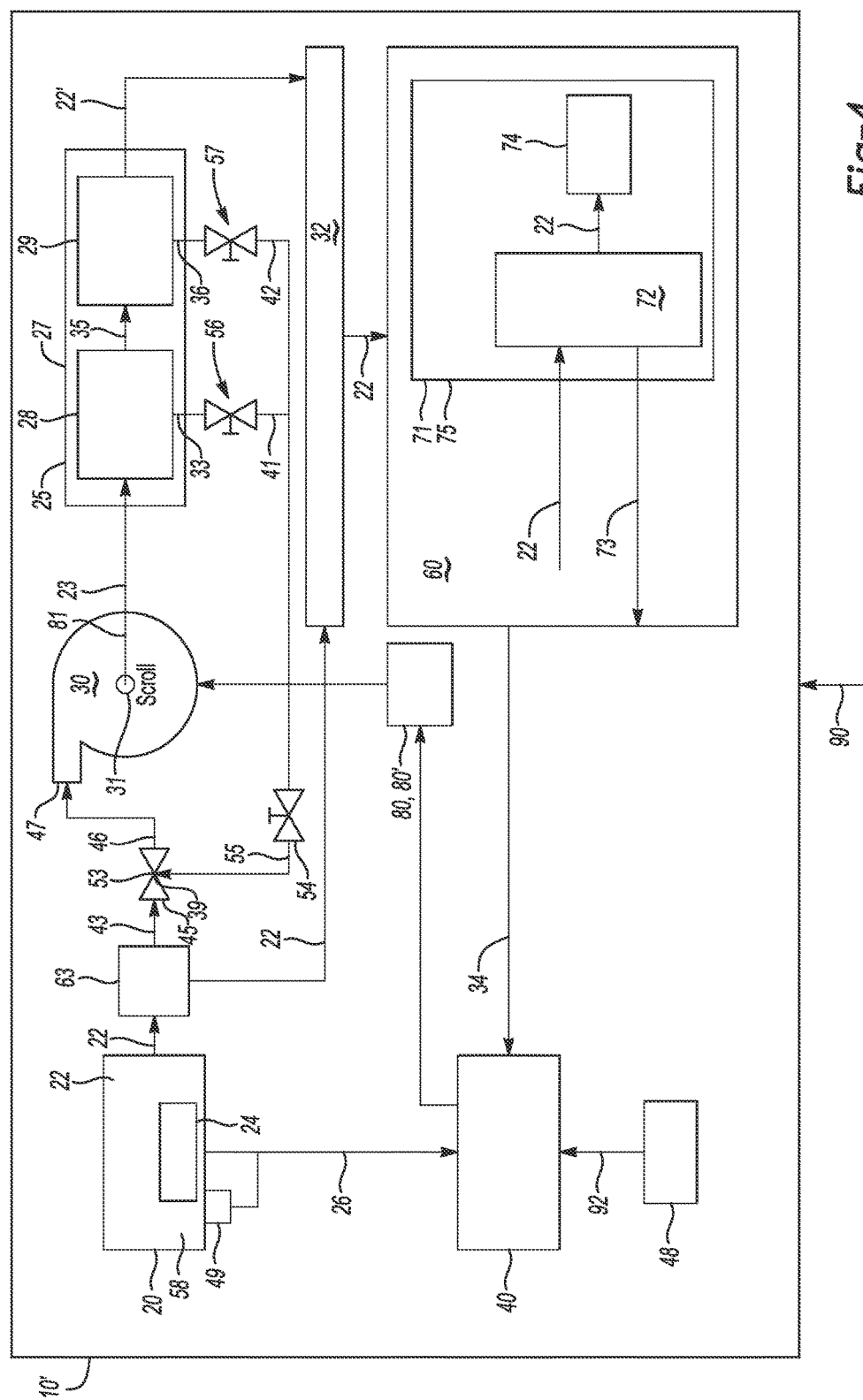
FIG. 4 is a system block diagram depicting an example of a vehicle having a powertrain including a natural gas fueled engine according to the present disclosure.

FIG. 4 is a system block diagram depicting an example of a natural gas fueled vehicle 10' having a powertrain 60 in which the internal combustion engine 71' is a dedicated natural gas fueled engine 75 according to the present disclosure. The natural gas fueled vehicle 10' shown in FIG. 4 is similar to the natural gas fueled vehicle 10 shown in FIG. 3 except the components related to the liquid fuel storage and delivery, as well as operations that are unique to bi-fueled vehicles (e.g. fuel selection) have been removed.

Figure 5:
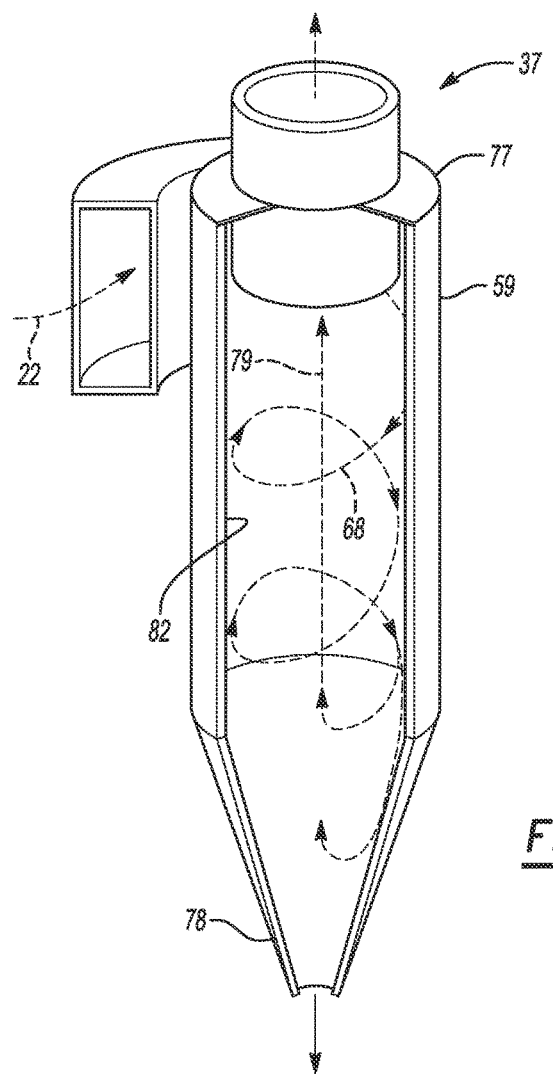
FIG. 5 is a perspective, cutaway semi-schematic view of an example of a cyclonic gas and oil separator according to the present disclosure.

FIG. 5 is a perspective, cutaway semi-schematic view of an example of a cyclonic gas and oil separator stage 37 according to the present disclosure. The cyclonic gas and oil separator stage 37 removes oil droplets from the natural gas stream by vortex separation without filter media. Rotational effects and gravity separate the mixture of compressed gas and oil droplets. A high speed rotating natural gas flow 68 is established within the cyclone container 59. The natural gas 22 flows in a helical pattern, beginning at the top 77 of the cyclone container 59 and ending at the bottom end 78 before exiting the cyclone container in a straight stream 79 through the center of the cyclone container 59 and out the top 77. Oil droplets and particles in the rotating natural gas flow 68 stream have too much inertia to follow the small radius of curvature of the path of the rotating natural gas flow 68 stream. The oil droplets and particles strike the wall 82, then fall to the bottom end 78 of the cyclone container where the oil and particles are removed. As the rotating natural gas flow 68 moves towards the narrow bottom end 78 of the cyclone container 59, the rotational radius of the rotating natural gas flow 68 stream is reduced, thus separating smaller and smaller oil droplets.

Figure 6:
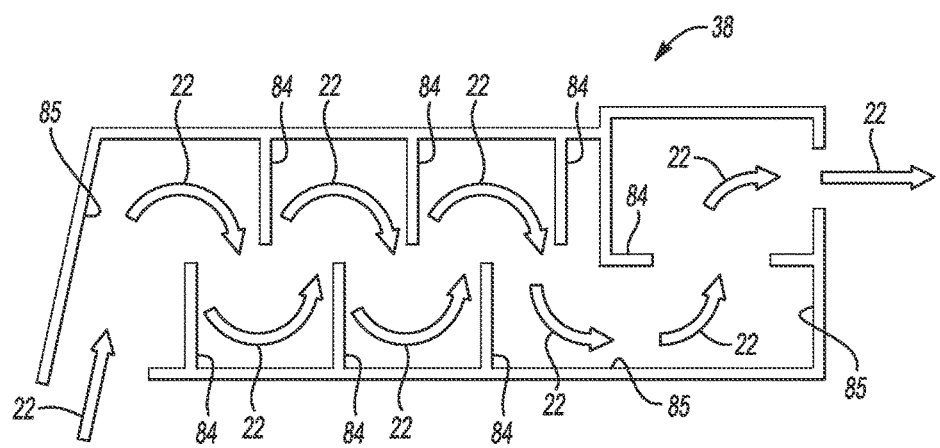
FIG. 6 is a cross sectional, semi-schematic view of an example of a labyrinthal gas and oil separator according to the present disclosure.

FIG. 6 is a cross sectional, semi-schematic view of an example of a labyrinthal gas and oil separator stage 38 according to the present disclosure. The natural gas 22 is forced through a series of baffles 84. Similar to the cyclonic gas and oil separator stage 37, the labyrinthal gas and oil separator stage 38 uses inertia, the cohesion of oil molecules to each other, and the adhesion of oil molecules to the surface 85 of the baffles 84. The oil droplets cling to the surface 85 of the baffles 84. The more surface area the oil has to cling to, the more oil separates from the natural gas. The droplets coalesce into larger drops and are extracted from the labyrinthal gas and oil separator stage 38. In an example, the oil that is collected may drain down into the second oil flow regulator 57 to enter the second oil recirculation tube 42 (see FIG. 3).

Figure 7:
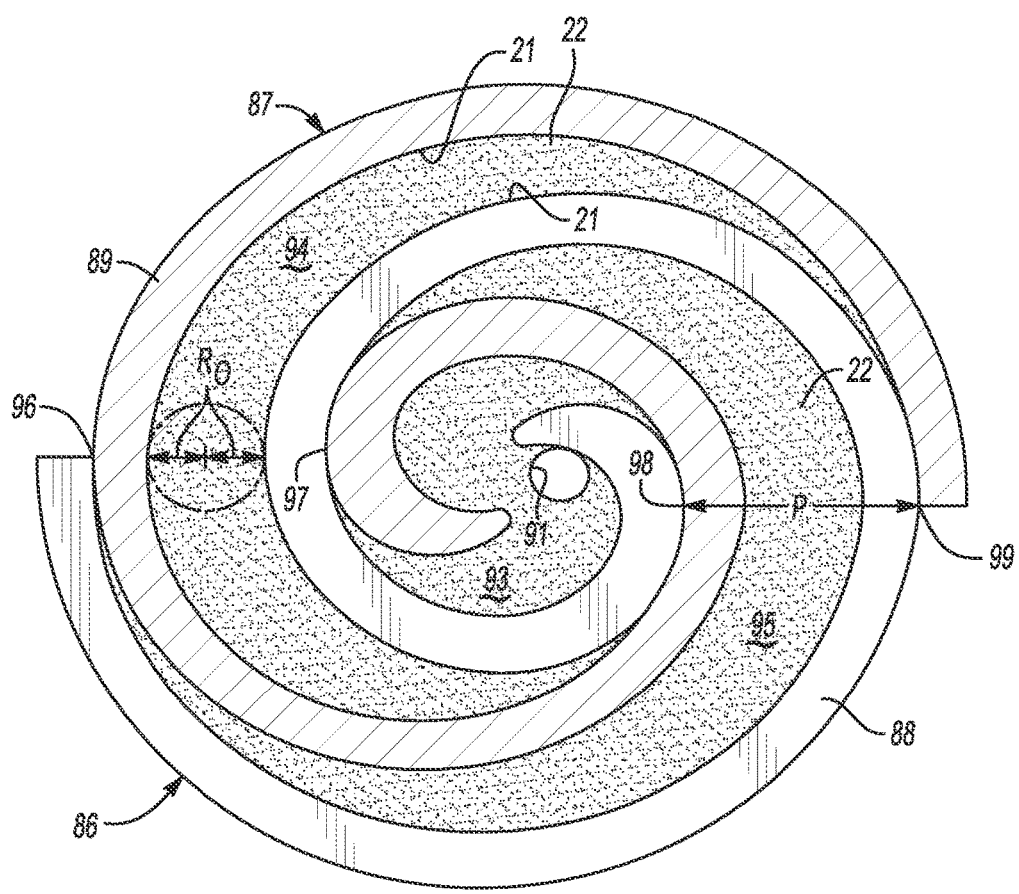
FIG. 7 is a semi-schematic cross-sectional view depicting an example of a fixed scroll, and an orbital scroll of a scroll compressor according to the present disclosure.

FIG. 7 is a semi-schematic cross-sectional view depicting an example of a fixed scroll 86, and an orbital scroll 87 of the scroll compressor 30 according to the present disclosure. The fixed scroll 86 includes a flat end plate 93 and an involute spiral wrap element 88. An orbital scroll 87 cooperates with the fixed scroll 86. The orbital scroll 87 includes a flat end plate (not shown) and an involute spiral wrap 89. Although the example depicted in FIG. 7 has involute spirals, the spirals may have other forms, for example an Archimedean spiral. The wrap side surface of the flat end plate 93 is parallel to the wrap side surface of the orbital scroll end plate. In examples of the present disclosure, the scroll compressor 30 may include two interleaving metallic scrolls 86, 87 having a ceramic surface coating 21 to reduce chemical interaction between the scrolls 86, 87 and the natural gas 22. The wrap 88 of the fixed scroll 86 has the same pitch P as the wrap 89 of orbital scroll 87. The wraps 88 and 89 are in contact with each other along lines perpendicular to the fixed scroll flat end plate 93 and the orbital scroll end plate. The locations of the contact lines 96, 97, 98 and 99, when the scrolls 86 and 87 are in one position relative to each other, are shown in FIG. 7. The contacts between the wraps 88 and 89 and between the axial ends of the wraps and the flat end plates form sealed pockets 94 and 95.

When the orbital scroll 87 orbits in a counter clockwise direction, as seen in FIG. 7, and in an orbit with a radius Ro, the contact lines 96, 97, 98 and 99 move counter clockwise along the surfaces of the wraps 88 and 89 and the sealed pockets 94 and 95 move toward the center of the scrolls 86 and 87. As the sealed pockets 94 and 95 move toward the center of the scrolls 86 and 87 the pockets become smaller and the gas in the pockets 94, 95 is compressed. A scroll discharge aperture 91 is provided near the center of the fixed scroll 86 to allow compressed natural gas to pass from the scrolls 86, 87 into the output 31 of the scroll compressor 30. Oil is used to cool and lubricate the scroll compressor 30. Some of the cooling and lubricating oil becomes entrained in the natural gas stream and is carried along with the compressed natural gas that is discharged from the scroll compressor 30 as the first mixture 23 of compressed natural gas and oil (see FIG. 3).

In an example, the flow capacity of the scroll compressor 30 may correspond to the maximum power for the ICE 71. In an example of the present disclosure, the scroll compressor 30 may have a flow capacity of about 16 $Nm^3/h$ (Normal Cubic Meters per Hour) of natural gas. A flow rate 16 $Nm^3/h$ converts to about 3.55 g/s (grams per second) of natural gas based on natural gas with a density of 0.8 (kg) kilograms per cubic meter at 0° C. and 1 atmosphere. If the natural gas has an energy density of about 55 MJ/kg (Megajoules per kilogram), then 3.55 g/s of natural gas corresponds to a power of about 268 hp (horsepower) available to the ICE 71 from the natural gas 22. The actual flow rate depends on a pressure difference between the pressure at the intake 47 and the output 31 of the scroll compressor 30.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 6 VDC to about 100 VDC should be interpreted to include not only the explicitly recited limits of from about 6 VDC to about 100 VDC, but also to include individual values, such as 6 VDC, 12 VDC, 48 VDC, etc., and sub-ranges, such as from about 6 VDC to about 16 VDC; from about 32 VDC to about 56 VDC, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A natural gas fueled vehicle, comprising:
   a natural gas fueled Internal Combustion Engine (ICE) configured to provide motive power to the vehicle;
   a pressurizable tank disposed on the vehicle, the pressurizable tank being configured to contain a natural gas;
   a natural gas adsorbent disposed in the pressurized tank;
   a fuel supply tube configured to convey the natural gas to the ICE;
   a scroll compressor configured to receive the natural gas and to discharge a first mixture of a compressed natural gas and an oil; and
   a two-stage gas and oil separator configured to receive the first mixture of the compressed natural gas and the oil from the scroll compressor, the two-stage gas and oil separator comprising a first stage gas and oil separator in fluid communication with an output of the scroll compressor to separate a first portion of the oil from the first mixture of the compressed natural gas and the oil and discharge a second mixture of the compressed natural gas and the oil to be received by a second stage gas and oil separator to separate a second portion of the oil from the second mixture of the compressed natural gas and the oil to discharge the compressed natural gas to the fuel supply tube substantially free from the oil;

a compressor bypass valve disposed downstream of the pressurizable tank, the compressor bypass valve being configured to enter a bypass mode to cause the natural gas to bypass the scroll compressor and flow through the fuel supply tube when a tank pressure of the natural gas in the pressurized tank is greater than an uncompressed cut-off pressure; and a venturi configured to draw the first portion of the oil from the first stage gas and oil separator and the second portion of the oil from the second stage gas and oil separator into a stream of natural gas from the pressurized tank via an oil port in a throat of the venturi.

2. The natural gas fueled vehicle as defined in claim 1 wherein the two-stage gas and oil separator includes (a) two cyclonic gas and oil separator stages, (b) two labyrinthal gas and oil separator stages, or (c) a cyclonic gas and oil separator stage and a labyrinthal gas and oil separator stage.

3. The natural gas fueled vehicle as defined in claim 1 further comprising an oil flow regulator to throttle a main oil flow to the oil port.

4. The natural gas fueled vehicle as defined in claim 1 further comprising:
a first oil flow regulator to throttle the first portion of the oil from the first stage gas and oil separator to the oil port; and
a second oil flow regulator to throttle the second portion of the oil from the second stage gas and oil separator to the oil port.

5. The natural gas fueled vehicle as defined in claim 1 wherein the scroll compressor includes two interleaving metallic scrolls having a ceramic surface coating to reduce chemical interaction between the scrolls and the natural gas.

6. The natural gas fueled vehicle as defined in claim 1, further comprising:
an electric motor operatively connected to the scroll compressor to drive the scroll compressor;
a pressure sensor in fluid communication with the pressurized tank to determine the tank pressure; and
an electronic control module to control operation of the electric motor in response to the tank pressure wherein the electronic control module causes the electric motor to drive the scroll compressor to compress the natural gas when the tank pressure is between a minimum tank pressure and the uncompressed cut-off pressure, and wherein the electronic control module causes the electric motor to stop thereby preventing the scroll compressor from compressing the natural gas when the tank pressure is greater than the uncompressed cut-off pressure.

7. The natural gas fueled vehicle as defined in claim 6 wherein the electric motor has an input power of from about 200 Watts to about 10 Kilowatts and an input voltage from about 6 VDC (Volts Direct Current) to about 100 VDC.

8. The natural gas fueled vehicle as defined in claim 7 wherein the electric motor is a variable speed electric motor.

9. The natural gas fueled vehicle as defined in claim 8 wherein the electronic control module regulates an output pressure of the scroll compressor by changing a speed of the variable speed electric motor in response to the tank pressure and a fuel rail pressure.

10. The natural gas fueled vehicle as defined in claim 1 wherein the compressor bypass valve is electrically controlled, and a biasing spring causes the compressor bypass valve to enter the bypass mode and remain in the bypass mode when the compressor bypass valve is electrically unpowered.

11. The natural gas fueled vehicle as defined in claim 1 wherein the compressor bypass valve is mechanically controlled, and a biasing spring causes the compressor bypass valve to enter the bypass mode and remain in the bypass mode when the tank pressure is greater than the uncompressed cut-off pressure.

12. A natural gas fueled vehicle, comprising:
a natural gas fueled Internal Combustion Engine (ICE) configured to provide motive power to the vehicle;
a pressurizable tank disposed on the vehicle, the pressurizable tank being configured to contain a natural gas;
a natural gas adsorbent disposed in the pressurized tank;
a fuel supply tube configured to convey the natural gas to the ICE;
a scroll compressor disposed downstream of the pressurizable tank, the scroll compressor being configured to receive the natural gas from the pressurized tank and to discharge a first mixture of a compressed natural gas and an oil;
a two-stage gas and oil separator comprising:
a first stage gas and oil separator configured to receive the first mixture of the compressed natural gas and the oil, to separate a first portion of the oil from the first mixture of the compressed natural gas and the oil, to discharge a second mixture of the compressed natural gas and the oil, and to discharge the first portion of the oil; and
a second stage gas and oil separator configured to receive the second mixture of the compressed natural gas and the oil, to separate a second portion of the oil from the second mixture of the compressed natural gas and the oil, to discharge the compressed natural gas substantially free of the oil to the fuel supply tube, and to discharge the second portion of the oil; and
an oil recirculation tube configured to receive the first portion of the oil and the second portion of the oil, and to direct the first portion of the oil and the second portion of the oil into a stream of natural gas downstream of the pressurized tank and upstream of the scroll compressor.

13. The natural gas fueled vehicle as defined in claim 12 wherein the two-stage gas and oil separator includes (a) two cyclonic gas and oil separator stages, (b) two labyrinthal gas and oil separator stages, or (c) a cyclonic gas and oil separator stage and a labyrinthal gas and oil separator stage.

14. The natural gas fueled vehicle as defined in claim 12, further comprising a venturi, the venturi being configured to draw the first portion of the oil from the first stage gas and oil separator and the second portion of the oil from the second stage gas and oil separator into the stream of natural gas via an oil port in a throat of the venturi.

15. The natural gas fueled vehicle as defined in claim 14, further comprising an oil flow regulator to throttle a main oil flow to the oil port.

16. The natural gas fueled vehicle as defined in claim 14, further comprising:

a first oil flow regulator to throttle the first portion of the oil from the first stage gas and oil separator to the oil port; and a second oil flow regulator to throttle the second portion of the oil from the second stage gas and oil separator to the oil port.

* * * * *